June 4, 1940.  W. P. SCHMITTER  2,203,635
VARIABLE SPEED TRANSMISSION
Filed Jan. 6, 1936  6 Sheets-Sheet 3
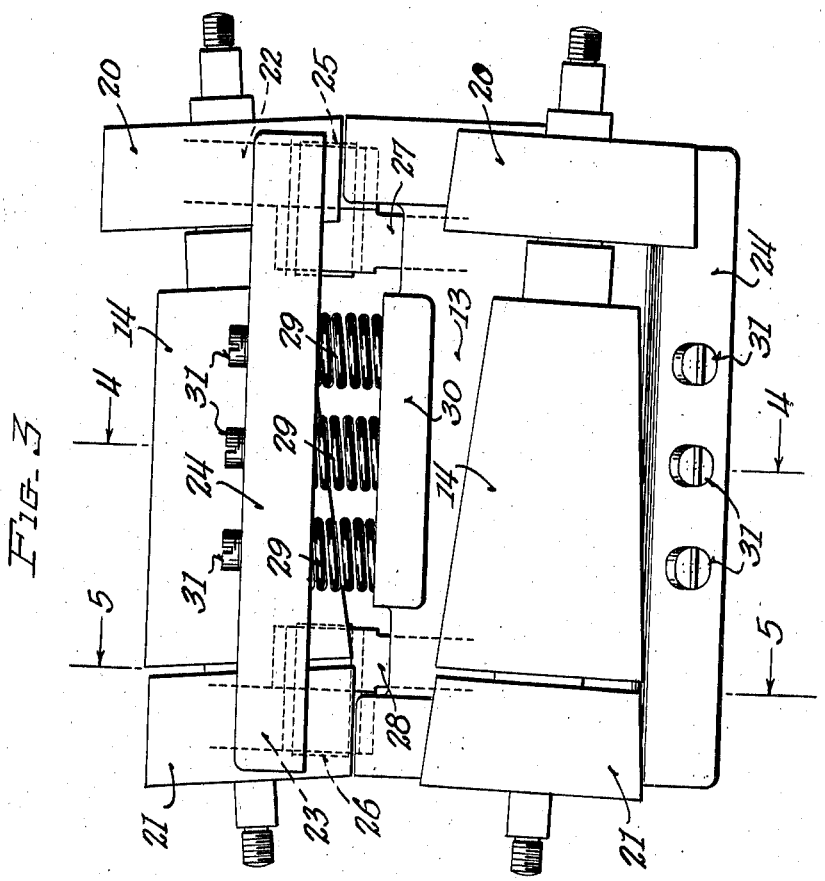
INVENTOR.
WALTER P. SCHMITTER
BY
ATTORNEY.

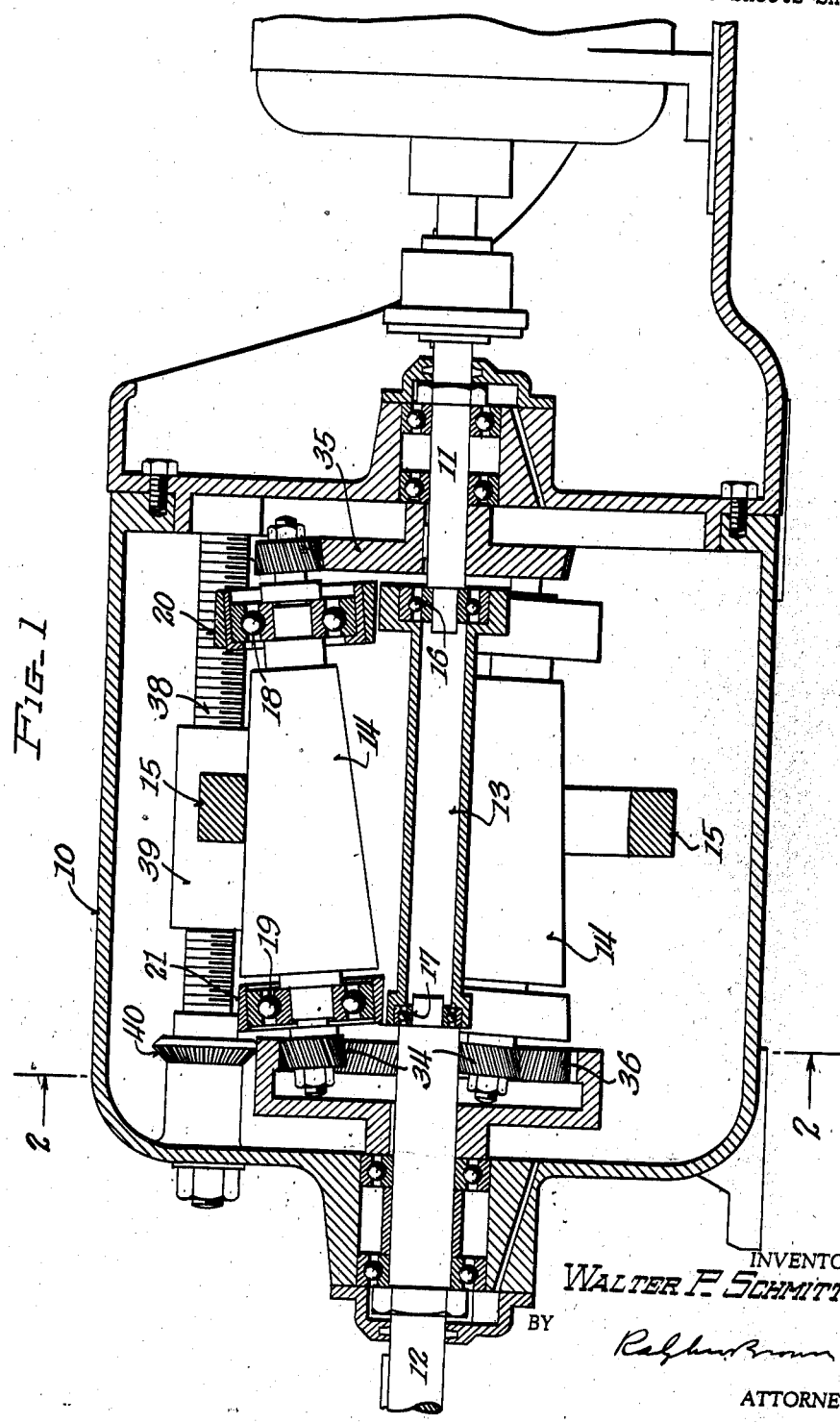

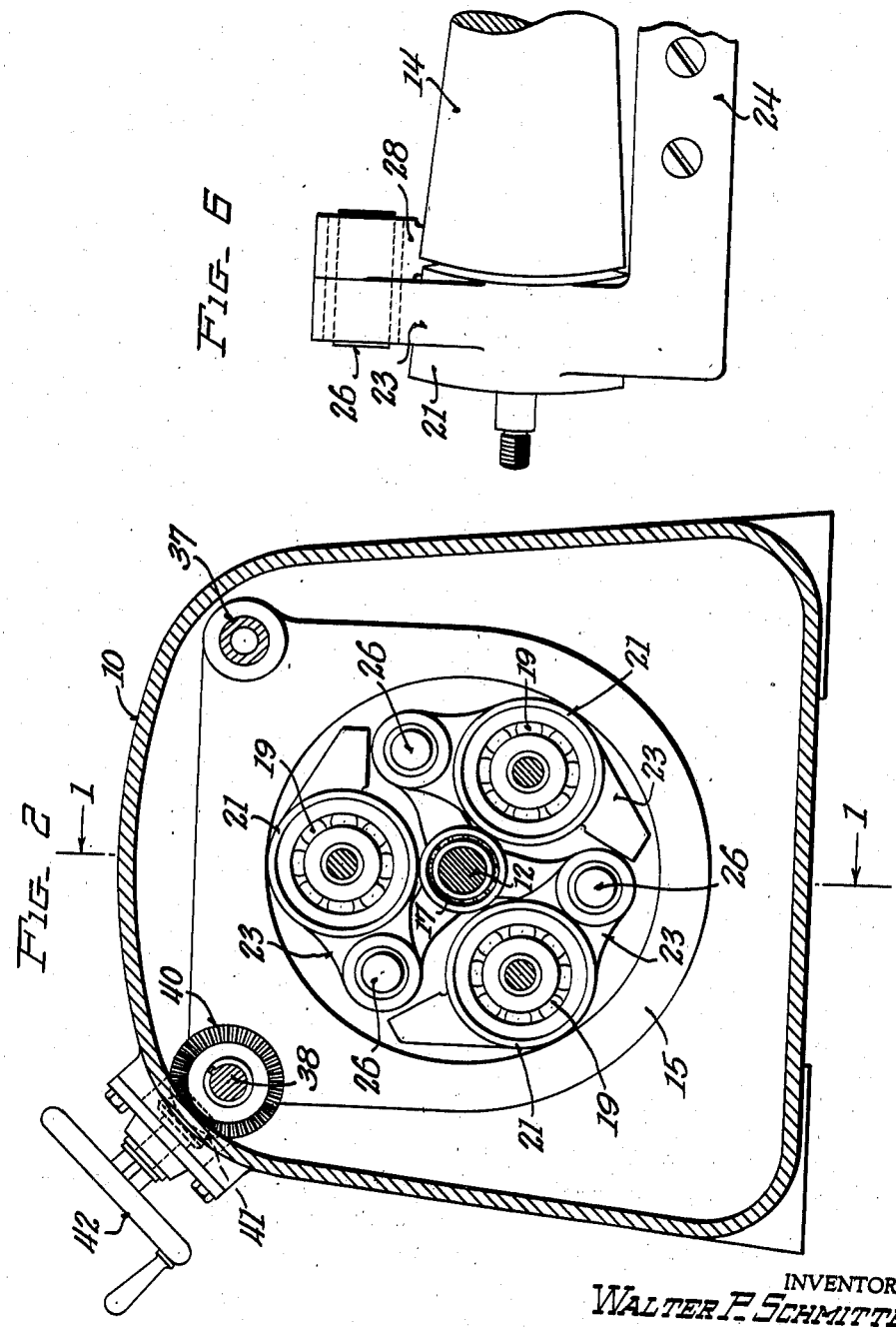

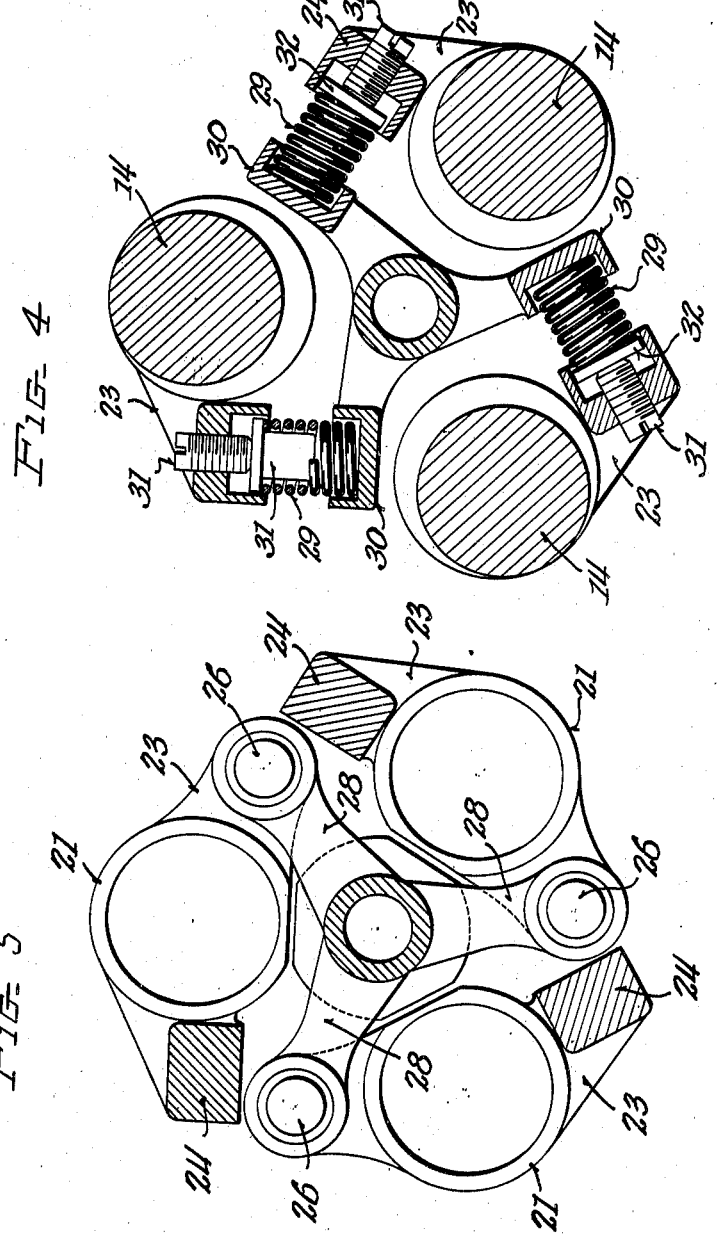

June 4, 1940.  W. P. SCHMITTER  2,203,635
VARIABLE SPEED TRANSMISSION
Filed Jan. 6, 1936    6 Sheets-Sheet 5
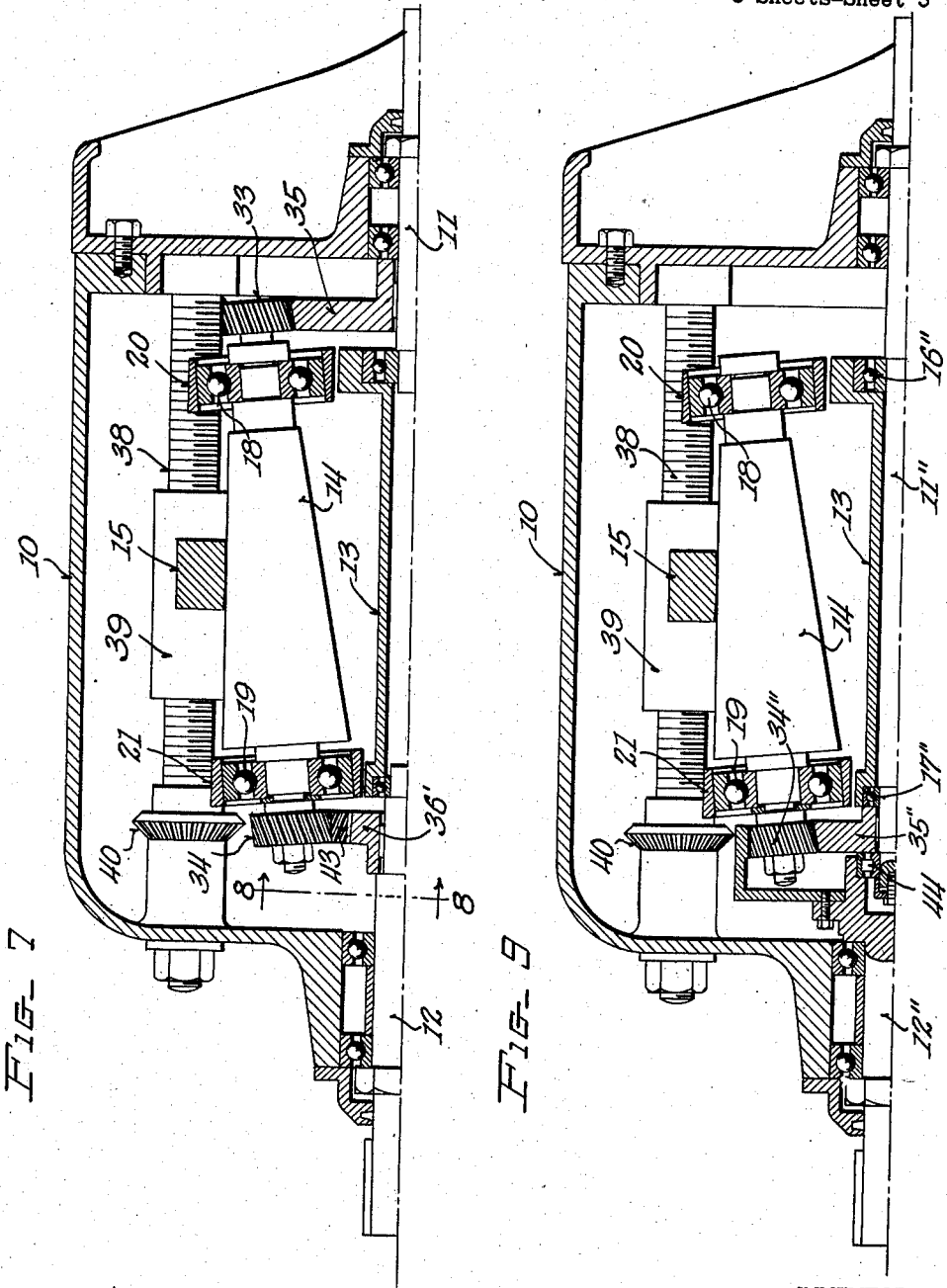
INVENTOR.
WALTER P. SCHMITTER
BY
ATTORNEY.

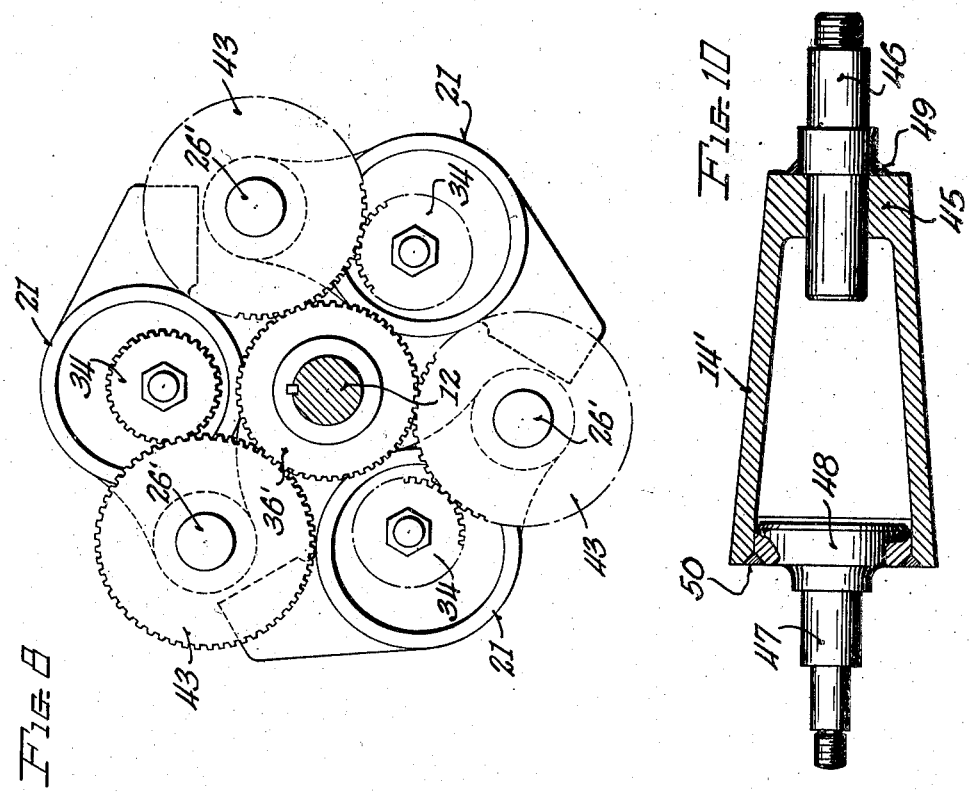

Patented June 4, 1940

2,203,635

UNITED STATES PATENT OFFICE 2,203,635

VARIABLE SPEED TRANSMISSION

Walter P. Schmitter, Milwaukee, Wis., assignor to The Falk Corporation, Milwaukee, Wis., a corporation of Wisconsin Application January 6, 1936, Serial No. 57,688

16 Claims. (Cl. 74—281)

This invention relates to variable speed transmissions of the type involving a set of inclined tapered planet rollers and a contact ring adjustable lengthwise thereof to regulate their planetary action.

A variable speed transmission of this type, which has proven commercially successful, is disclosed in the pending application of myself and Alfred G. Bade, Serial No. 52,095, filed November 29, 1935, and the general aim of the present invention is to further improve the construction and operation of transmissions of this type.

In the transmission shown in said application, the axes of the rollers are inclined and fixed relative to each other, and the required contact pressures between the rollers and ring are effectively maintained by urging the rollers along their inclined axes. This results in a wedge-like action between the rollers and ring, involving longitudinal movement of the rollers across the contact surface of the ring and against a substantial frictional resistance which increases as the contact pressures between the rollers and ring increase. This condition imposes a limit upon the contact pressures that can be developed with the result that the capacity of the transmission is correspondingly limited.

One object of the present invention is to avoid this limitation by so mounting the rollers as to permit them a free lateral movement against the ring and at the same time maintain their axes in position for proper functioning.

Another object is to provide improved means for maintaining the required contact pressures between the rollers and ring.

Another object is to provide for a greater variation in the operating characteristics of the transmission. This I accomplish by the use of two sets of gears at the opposite ends of the rollers, each set being replaceable to obtain any selected gear ratio independently of the other set.

Another object is to reduce to a minimum those bearing loads which ordinarily result from an unbalanced condition of the individual rollers induced by the centrifugal forces acting on the rollers and the reaction of the ring against the rollers.

Other objects and advantages will appear, expressed or implied, from the following description of three embodiments of the present invention.

In the accompanying drawings:

Figure 1 is a longitudinal sectional view of a variable speed transmission constructed in accordance with the present invention. This section is taken along the line 1—1 of Fig. 2.

Fig. 2 is a transverse sectional view taken along the line 2—2 of Fig. 1.

Fig. 3 is a side elevation of the roller assembly on a larger scale.

Figs. 4 and 5 are transverse sectional views on the lines 4—4 and 5—5, respectively.

Fig. 6 is a detail elevation of a roller mounting.

Fig. 7 is a fragmentary longitudinal sectional view of another embodiment of the invention.

Fig. 8 is a transverse sectional view on the line 8—8 of Fig. 7.

Fig. 9 is a fragmentary longitudinal sectional view of another embodiment of the invention.

Fig. 10 is a longitudinal sectional view of a modified form of roller such as may be employed in any of the three embodiments of the transmission shown.

The variable speed transmission shown in Figs. 1 to 6 is enclosed in a housing 10 similar to that disclosed in the application above identified and includes aligned driving and driven shafts 11 and 12 journalled in opposite ends of the housing.

A rotor, including a tubular structure 13, carries a set of inclined tapered rollers 14 in rolling contact with an encircling control ring 15. In this instance the rotor 13 is supported at opposite ends by appropriate bearings 16 and 17 mounted on the ends of the shafts 11 and 12 respectively.

Each roller 14 is journalled at its ends in bearings 18 and 19 fixed in appropriate heads 20 and 21 formed in the side arms 22 and 23 of a rockably mounted rigid frame. Each frame, comprising the arms 22 and 23 and a rigid bar 24 cast integral therewith, is rockably supported on a pair of aligned hinge pins 25 and 26, which are engaged in the ends of the arms 22 and 23 and carried in the ends of arms 27 and 28 which project substantially radially from the rotor 13. By this arrangement, each roller is laterally moveable with its supporting frame outwardly toward the ring 15 and its axis is securely restrained against movement except with the frame.

Provision is preferably made for pressing the rollers 14 against the ring 15. In this instance, each roller 14 is pressed outwardly by a plurality of springs 29 interposed between the bar 24 of the roller carrying frame and an abutment 30 provided on the rotor 13. The tension in each spring 29 may be regulated by a screw 31 threaded in the bar 24 and acting on a spring retainer 32 engaged in one end of the spring. The contact pressures between the rollers and ring may thus be regulated.

It will of course be understood that during operation of the transmission the contact pressures between rollers 14 and ring 15 are increased by the centrifugal forces acting on the rollers and their supporting frames, and in some instances these forces alone may be sufficient to maintain the required contact pressures independently of the springs.

In the transmission shown in Fig. 1, each roller 14 is provided with pinions 33 and 34 removably fixed to the opposite ends thereof. The pinion 33 of each roller meshes with and is driven by a sun gear 35 keyed or otherwise removably fixed to the drive shaft 11; and the pinion 34 of each roller meshes with and drives an internal gear 36 keyed or otherwise removably fixed to the driven shaft 12. The internal gear 36 is preferably so formed as to provide excess clearance at the bases of its teeth, so as to permit slight outward movement of the rollers 14 and their pinions 34 without objectionable interference.

It will of course be understood that the inclination of the several rollers 14 is equal and opposite to the angle of their taper, so that their outer extremities are substantially parallel to the axis of the rotor 13, and so that the ring 15 may be shifted to make contact therewith at various points in the length thereof. It will also be understood that such shifting of the ring 15 varies the planetary action of the rollers 14 due to the variation in roller radius at the various points in their length, and that such changes in planetary action cause changes in the operation of the driven gear 36 and driven shaft 12.

In this instance the ring 15 is supported by a guide rod 37 and a parallel feed screw 38 arranged in the upper part of the casing 10, the screw 38 being threaded in a boss 39 on the ring and being actuated by a pair of bevel gears 40 and 41 under control of an appropriate hand wheel 42. (See Fig. 2.)

It will also be noted that the rate of operation of the rollers 14 is dependent upon the relative sizes of the pinion 33 and gear 35, and that these may be selected or replaced to effect operation best suited to any particular conditions. Similarly the rate of operation of the driven shaft 12 is somewhat dependent upon the relative sizes of the pinion 34 and driven gear 36 and these may be selected or replaced at will and without regard to the relative sizes of pinions 33 and 35 that may have been chosen.

The transmission shown in Figs. 7 and 8 is substantially identical with that hereinabove described, except for the type of gears employed between the driven shaft 12 and the rollers 14. In this instance the driven shaft 12 is provided with an external gear 36' which meshes with idle gears 43, each journalled upon the projected end of a hinge pin 26', and each meshing with one of the roller pinions 34', all as indicated particularly in Fig. 8.

The transmission shown in Fig. 9 is also substantially identical with that shown in Fig. 1, except for the arrangement of gears and shafting. In this instance the drive shaft 11" extends to the driven shaft 12" and is partially supported by a bearing 44 provided in the latter. The rotor 13 is supported in bearings 16" and 17" on the drive shaft 11"; a pinion 35" on the drive shaft meshes with and drives pinions 34" on the ends of the rollers 14; and the pinions 34" mesh with and drive an internal gear 36" on the driven shaft 12".

It has been found that the centrifugal forces acting on the rollers 14 tend to unbalance them and impose a severe load on one of the bearings; particularly the bearing 18 at the small end of a roller. For example, when the ring 15 is near the small end of a roller 14 the centrifugal force, acting at the center of gravity of the roller, tends to tilt the roller about the ring as a fulcrum in such manner as to impose a heavy inward thrust against the bearing 18. This objectionable condition is substantially eliminated by the use of a roller such as shown at 14' in Fig. 10.

In this instance the roller 14' comprises a tapered hollow casting, as light as possible, consistent with strength, and having its small end closed by an end wall 45 thickened so as to position the center of gravity of the casting near the longitudinal center thereof. A stub shaft 46 fixed in the center of the wall 45 provides support for one end of the casting and also adds weight to the small end thereof. This shaft 46 is counterbalanced by the stub shaft 47 at its supporting disk 48 which is fixed in the open larger end of the casting. These stub shafts 46 and 47 are fixed in place preferably by welding, as indicated at 49 and 50.

Various changes may be made in any of the embodiments of the invention hereinabove specifically described without departing from or sacrificing the advantages of the invention as defined in the appended claims.

I claim:

1. In a variable speed transmission the combination of a rotor, a plurality of conical planet members rotatable with and with respect to said rotor and inclined with respect to the axis of rotation thereof, driving means for said members, encircling means adjustable to regulate the speed ratio of the transmission, separate carrier frames for said members individually moveable to press said members against said encircling means, and driven means responsive to the motion of said members.

2. In a variable speed transmission the combination of a rotor, a plurality of conical planet members rotatable with and with respect to said rotor and inclined with respect to the axis of rotation thereof, driving means for said members, encircling means adjustable to regulate the speed ratio of the transmission, separate carrier frames for said members rockably supported to permit outward movement of said members against said encircling means, and driven means responsive to the motion of said members.

3. In a variable speed transmission the combination of a rotor, a plurality of conical planet members rotatable with and with respect to said rotor and inclined with respect to the axis of rotation thereof, driving means for said members, encircling means adjustable to regulate the speed ratio of the transmission, separate carrier frames for said members rockably supported to permit lateral movement of said members, spring pressed means acting on said frames to press said members against said encircling means, and driven means responsive to the motion of said members.

4. In a variable speed transmission the combination of a rotor, a plurality of conical planet members rotatable with the rotor and also rotatable with respect to the rotor about individual axes inclined and transversely moveable relative to the rotor, rotary driving means, encircling means adjustable to regulate the speed ratio of the transmission, spring pressed means for inducing such transverse movement of said axes thereby to force said members into pressure contact with said encircling means, and rotary driven means responsive to the motion of said members.

5. In a variable speed transmission the combination of a rotor, a plurality of conical planet members rotatable with the rotor and also rotatable with respect to the rotor about individual axes inclined and transversely moveable relative to the rotor, driving means, encircling means adjustable to regulate the speed ratio of the transmission, supports for said members transversely moveable with said axes, means acting on said supports to induce pressure contact between said members and encircling means, and driven means responsive to the motion of said members.

6. In a variable speed transmission the combination of a rotor, a plurality of conical planet members rotatable with and with respect to said rotor and inclined with respect to the axis of rotation thereof, driving means for said members, encircling means adjustable to regulate the speed ratio of the transmission, a separate carrier frame for each of said members rockably mounted on said rotor, and driven means responsive to the motion of said members.

7. In a variable speed transmission the combination of a rotor, a plurality of conical planet rollers rotatable with the rotor and also rotatable with respect to the rotor about individual axes inclined and transversely moveable relative to the rotor, an encircling ring shiftable lengthwise of said rollers, mechanism for inducing such transverse movement of said axes thereby to force said rollers into pressure contact with said ring, said rollers being also centrifugally urged into pressure contact with said ring, driving means for said rotor and rollers, and driven means responsive to the motion of said rollers.

8. In a variable speed transmission the combination of a rotor, a plurality of inclined conical planet rollers rockably mounted thereon and rotatable with and with respect thereto, an encircling ring shiftable lengthwise of said rollers, mechanism urging said rollers to rock into pressure contact with said ring, said rollers being additionally centrifugally urged into pressure contact with said ring, driving means for said rotor and rollers, and driven means responsive to the motion of said rollers.

9. In a variable speed transmission the combination of a rotor, a plurality of tapered planet rollers rotatable with and with respect to said rotor and inclined with respect to the axis of rotation thereof, an encircling contact ring shiftable lengthwise of said rollers, said rollers being movable to produce contact pressure between the rollers and the ring, means for driving said rollers, a driven gear, a separate gear driven by each of said rollers and movable with said rollers, and an idler gear interposed between each of said last named gears and said driven gear.

10. In a variable speed transmission, the combination of a plurality of planetary rollers, driving means therefor, an encircling ring adjustable to regulate the speed ratio of the transmission, a rotor, separate carrier frames for said rollers mounted in said rotor and rockable about an axis in said rotor to permit pressure of the rollers against the ring, a driven gear, a separate gear driven by each of said rollers, and an idler gear interposed between each of said last named gears and said driven gear, the axis of each idler gear being substantially coincident with said axis of one of said carrier frames.

11. In a variable speed transmission the combination of a plurality of tapered planet rollers, a rotor carrying said rollers, an encircling contact ring shiftable lengthwise of said rollers, and means for pressing said rollers against said ring, said rollers being hollow to reduce their weight and balanced to position the center of gravity thereof adjacent a mid-point in their length.

12. In a variable speed transmission, the combination of a rotor, a plurality of conical planetary rollers rotatable with and with respect to said rotor and inclined with respect to the axis of rotation thereof, means encircling and contacting said rollers and shiftable lengthwise thereof, and separate heavy carrier frames for each of said rollers mounted in said rotor for movement outwardly thereof, said carrier frames being urged outwardly by centrifugal force to press said rollers against said encircling means.

13. In a variable speed transmission, the combination of a circular control element, a longitudinally tapered planetary member inclined with respect to the axis of said element, means for mounting said member to rock transversely of said axis and to revolve about said axis in rolling engagement with said element, said rotary member and said control element being relatively moveable to regulate the speed ratio of said transmission, said means comprising a rotor, and a support for said member mounted on said rotor to revolve with said member about said axis and moveable transversely of said axis so as to rock and thereby press said member against said element.

14. In a variable speed transmission, the combination of a circular control element, a rotor, a longitudinally tapered planet member, means mounting said member to revolve with said rotor about the axis of said element in rolling engagement with said element and to move transversely relative to said rotor, the axis of said planet member being inclined with respect to the axis of said element and transversely moveable toward said element to induce pressure contact between said member and said element, a device for inducing such transverse movement, said rotary member and said control element being relatively moveable to regulate the speed ratio of said transmission.

15. In a variable speed transmission the combination of a rotor, a plurality of conical planet members rotatable with the rotor and also rotatable with respect to the rotor about individual axes inclined and moveable relative to said rotor and to the axis of said rotor, driving means, encircling means adjustable to regulate the speed ratio of the transmission, supports for said members transversely moveable with said axes, means acting on said supports to induce pressure contact between said members and encircling means, and driven means responsive to the motion of said members.

16. In a variable speed transmission the combination of a rotor, a plurality of conical planetary rollers rotatable with the rotor and also rotatable with respect to the rotor about individual axes inclined with respect to the axis of said rotor, rotary driving means, encircling means adjustable to regulate the speed ratio of the transmission, roller mounting means rendering said roller axes moveable to permit movement of said rollers toward said encircling means, spring means urging said rollers toward said encircling means to induce pressure contact therebetween, and driven means responsive to the planetary motion of said rollers.

WALTER P. SCHMITTER.